United States Patent
Appireddygari Venkataramana et al.

(10) Patent No.: US 11,954,354 B2
(45) Date of Patent: Apr. 9, 2024

(54) SYSTEM AND METHOD FOR A CONTENT BASED CLASSIFICATION AND ADAPTIVE DATA ENCRYPTION

(71) Applicant: EMC IP Holding Company LLC, Hopkinton, MA (US)

(72) Inventors: Mahesh Reddy Appireddygari Venkataramana, Bangalore (IN); Gururaj Kulkarni, Bangalore (IN); Swaroop Shankar D H, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 711 days.

(21) Appl. No.: 16/665,593

(22) Filed: Oct. 28, 2019

(65) Prior Publication Data

US 2021/0124495 A1    Apr. 29, 2021

(51) Int. Cl.
G06F 3/06 (2006.01)
G06F 9/455 (2018.01)
G06F 21/60 (2013.01)

(52) U.S. Cl.
CPC .......... *G06F 3/065* (2013.01); *G06F 3/0619* (2013.01); *G06F 3/0664* (2013.01); *G06F 3/067* (2013.01); *G06F 9/45533* (2013.01); *G06F 21/602* (2013.01); *G06F 2221/2107* (2013.01)

(58) Field of Classification Search
CPC ...... G06F 3/065; G06F 3/0619; G06F 3/0664; G06F 3/067; G06F 9/45533; G06F 21/602; G06F 2221/2107
See application file for complete search history.

(56) References Cited

U.S. PATENT DOCUMENTS

| | | | |
|---|---|---|---|
| 9,135,033 B1* | 9/2015 | Lee | G06F 9/455 |
| 10,678,651 B1* | 6/2020 | Borodin | G06F 9/45558 |
| 2010/0262796 A1* | 10/2010 | Camborde | G06F 11/1458 |
| | | | 711/E12.103 |
| 2011/0271279 A1* | 11/2011 | Pate | G06F 9/45558 |
| | | | 718/1 |
| 2020/0320208 A1* | 10/2020 | Bhosale | G06N 3/08 |

* cited by examiner

*Primary Examiner* — Eric Cardwell
(74) *Attorney, Agent, or Firm* — Chamberlain, Hrdlicka, White, Williams & Aughtry; Aly Z. Dossa

(57) ABSTRACT

A method for performing a backup operation includes obtaining, by a backup server, a backup request, wherein the backup request specifies a virtual machine to be backed up, wherein the virtual machine is hosted by a production host, and in response to the backup request: obtaining classification data from the backup agent, initiating a backup classification on an unprocessed backup associated with the virtual machine based on the classification data to obtain a sensitivity tag, and initiating a data processing on the unprocessed backup based on the sensitivity tag.

11 Claims, 8 Drawing Sheets

SYSTEM AND METHOD FOR A CONTENT BASED CLASSIFICATION AND ADAPTIVE DATA ENCRYPTION

BACKGROUND

Computing devices may include any number of internal components such as processors, memory, and persistent storage. Each of the internal components of a computing device may be used to generate data and to execute functions. The process of generating, storing, and sending data may utilize computing resources of the computing devices such as processing and storage. The utilization of the aforementioned computing resources to generate data and to send data to other computing devices may impact the overall performance of the computing resources.

SUMMARY

In general, in one aspect, the invention relates to a method for performing backup operations. The method includes obtaining, by a backup server, a backup request, wherein the backup request specifies a virtual machine to be backed up, wherein the virtual machine is hosted by a production host, and in response to the backup request: obtaining classification data from the backup agent, initiating a backup classification on an unprocessed backup associated with the virtual machine based on the classification data to obtain a sensitivity tag, and initiating a data processing on the unprocessed backup based on the sensitivity tag.

In general, in one aspect, the invention relates to a system that includes a processor and memory that includes instructions which, when executed by the processor, perform a method. The method includes obtaining, by a backup server, a backup request, wherein the backup request specifies a virtual machine to be backed up, wherein the virtual machine is hosted by a production host, and in response to the backup request: obtaining classification data from the backup agent, initiating a backup classification on an unprocessed backup associated with the virtual machine based on the classification data to obtain a sensitivity tag, and initiating a data processing on the unprocessed backup based on the sensitivity tag.

In general, in one aspect, the invention relates to a non-transitory computer readable medium that includes computer readable program code, which when executed by a computer processor enables the computer processor to perform a method for performing a backup operation. The method includes obtaining, by a backup server, a backup request, wherein the backup request specifies a virtual machine to be backed up, wherein the virtual machine is hosted by a production host, and in response to the backup request: obtaining classification data from the backup agent, initiating a backup classification on an unprocessed backup associated with the virtual machine based on the classification data to obtain a sensitivity tag, and initiating a data processing on the unprocessed backup based on the sensitivity tag.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, one or more embodiments of the invention relate to performing a backup operation using a content-based classification of data to determine a level of security (e.g., encryption) to be performed on backups of the data prior to storage. Embodiments of the invention relate to using a classification engine running in a virtual machine and communicating with a backup agent via an application programming interface (API) to provide classification data to the backup agent. The communication may be in response to, or independent from, a backup request of the virtual machine. The classification data may be analyzed to obtain a sensitivity tag to be associated with the virtual machine. A processing engine of the virtual machine may process the backup using the sensitivity tag and provide the processed backup to a backup storage system.

Figure 1:
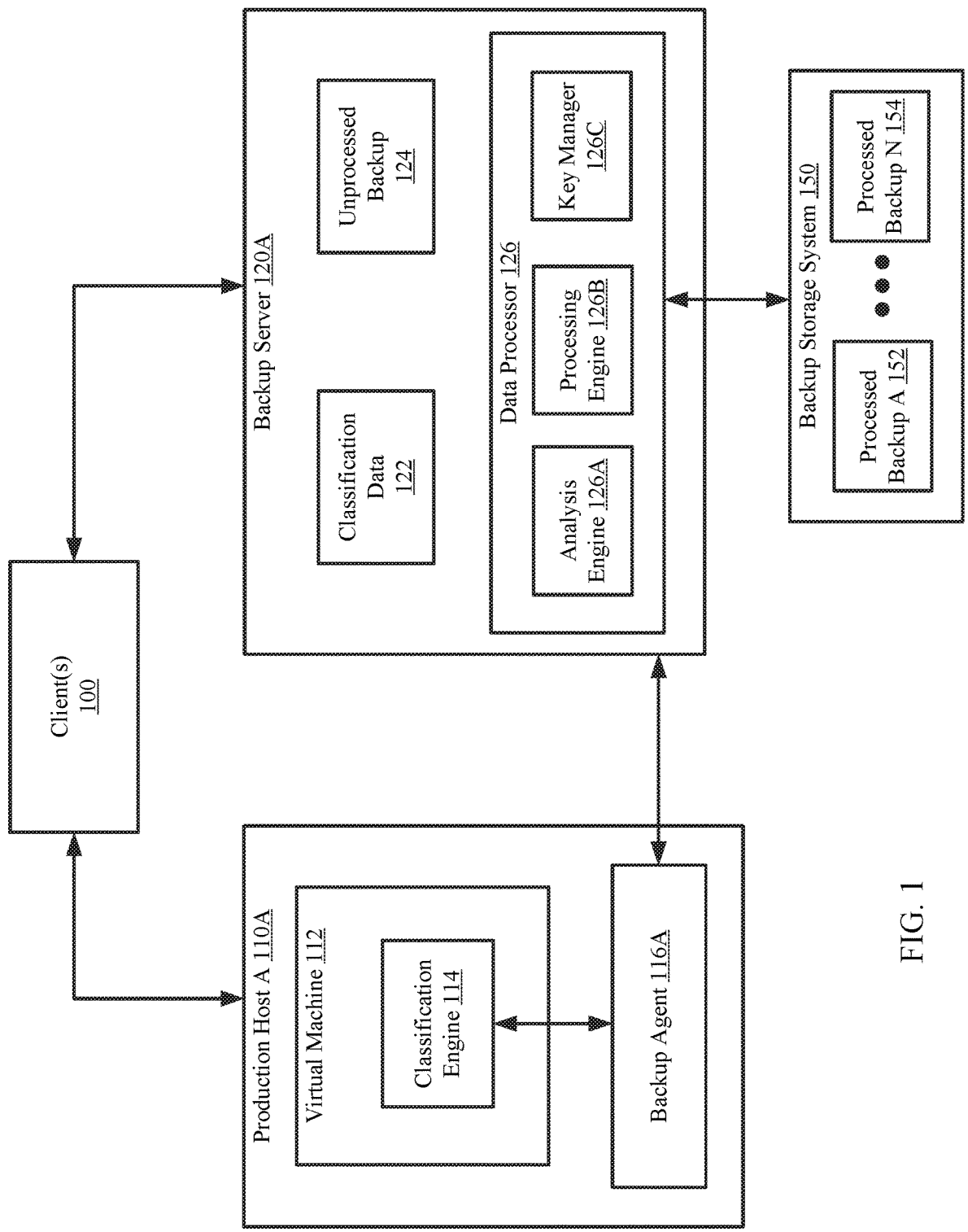
FIG. 1 shows a diagram of a system in accordance with one or more embodiments of the invention.

FIG. 1 shows a diagram of a system in accordance with one or more embodiments of the invention. The system may include one or more clients (100), a production host (110A), a backup server (120A), and a backup storage system (150). The system may include additional, fewer, and/or different components without departing from the invention. Each component may be operably connected to any of the other components via any combination of wired and/or wireless connections. Each of the aforementioned components is discussed below.

In one or more embodiments of the invention, the production host (110A) hosts virtual machines (VMs) (e.g., 112). The VMs (112) may be logical entities executed using computing resources (not shown) of the production host (110A). Each of the virtual machines hosted by the production host (110A) may be performing similar or different processes. In one or more embodiments of the invention, the VM (112) provides services to users, e.g., clients (100). For example, the VM (112) may host components. The components may be, for example, instances of databases, email servers, and/or other applications. The VMs (112) may host other types of components without departing from the invention. While the production host is illustrated to host one virtual machine (112), the production host may host multiple virtual machines without departing from the invention. The discussion of the virtual machine (112) throughout this application may apply to any virtual machine hosted by the production host.

In one or more embodiments of the invention, the virtual machine (112) includes a classification engine (114). The classification engine (114) collects data that specifies the functionality, use, and/or other information associated with the virtual machine (112). The collected data may be, for example, classification data. The classification data may be provided to the backup agent (116) and/or other entity of the system without departing from the invention.

In one or more embodiments of the invention, the classification engine (114) obtains the classification data by sending application programming interface (API) commands to the applications operating on the virtual machine. For example, a virtual machine may host multiple databases. The classification engine (114) may send API commands to each database to obtain a copy of all or a portion of data and/or metadata being generated by the application.

In one or more embodiments of the invention, the classification engine (114) sends the API requests to multiple virtual machines hosted by the production host (110A). In this manner, each classification engine (114) may monitor the data of one or more virtual machines.

In one or more of embodiments of the invention, the virtual machine (112) is implemented as computer instructions, e.g., computer code, stored on a persistent storage (e.g., on the production host (110A)) that when executed by a processor(s) of the production host (110A) cause the production host (110A) to provide the functionality of the virtual machine (112) described throughout this application.

In one or more embodiments of the invention, the production host (110A) includes a backup agent (116A). The backup agent may include functionality for generating backups of the virtual machine (112) and/or sending the backups to the backup server (120A) for further processing. The backup agent may perform the backup generation in accordance with the method illustrated in FIG. 2B.

In one or more embodiments of the invention, the backup agent (116A) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup agent (116A) described throughout this application and/or all, or a portion thereof, of the method illustrated in FIG. 2B.

Figure 2A:
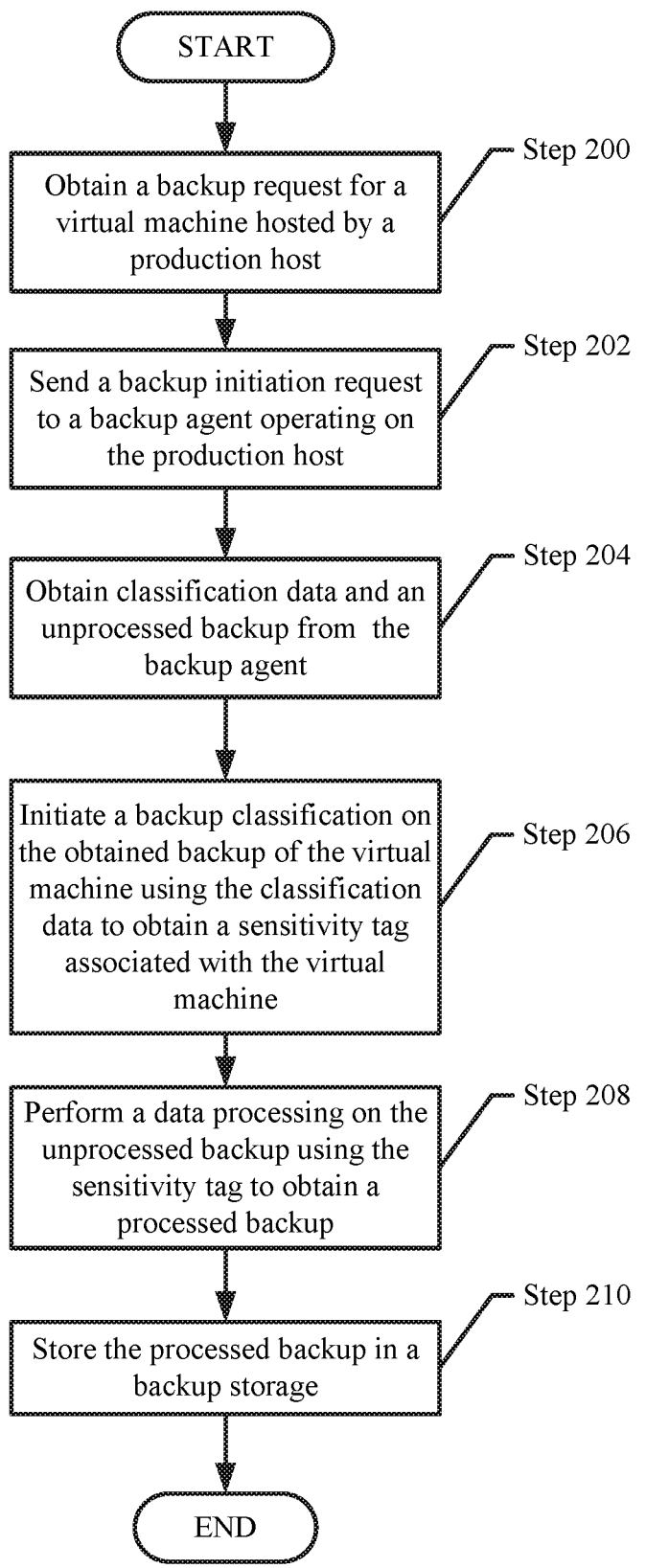
FIG. 2A shows a flowchart for servicing backup requests in accordance with one or more embodiments of the invention.
Figure 2B:
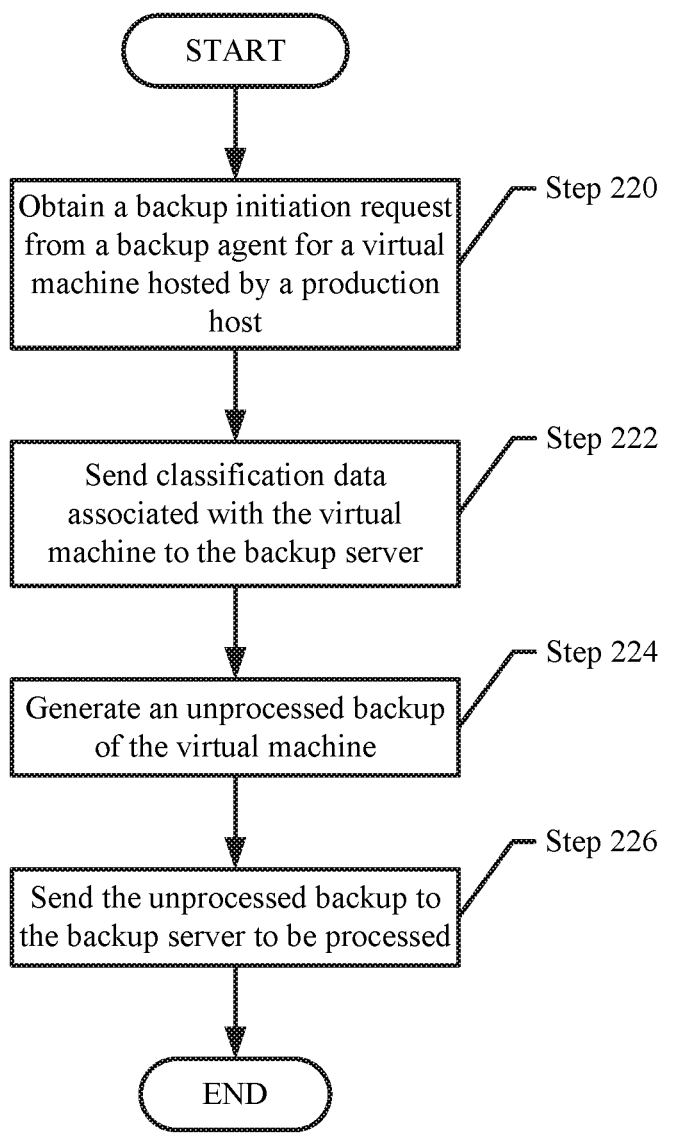
FIG. 2B shows a flowchart for servicing backup initiation requests in accordance with one or more embodiments of the invention.

In one or more of embodiments of the invention, the backup agent (116A) is implemented as computer instructions, e.g., computer code, stored on a persistent storage that when executed by a processor of the production host (110A) causes the production host (110A) to provide the functionality of the backup agent (116A) described throughout this application and/or all, or a portion thereof, of the method illustrated in FIG. 2B.

Figure 6:
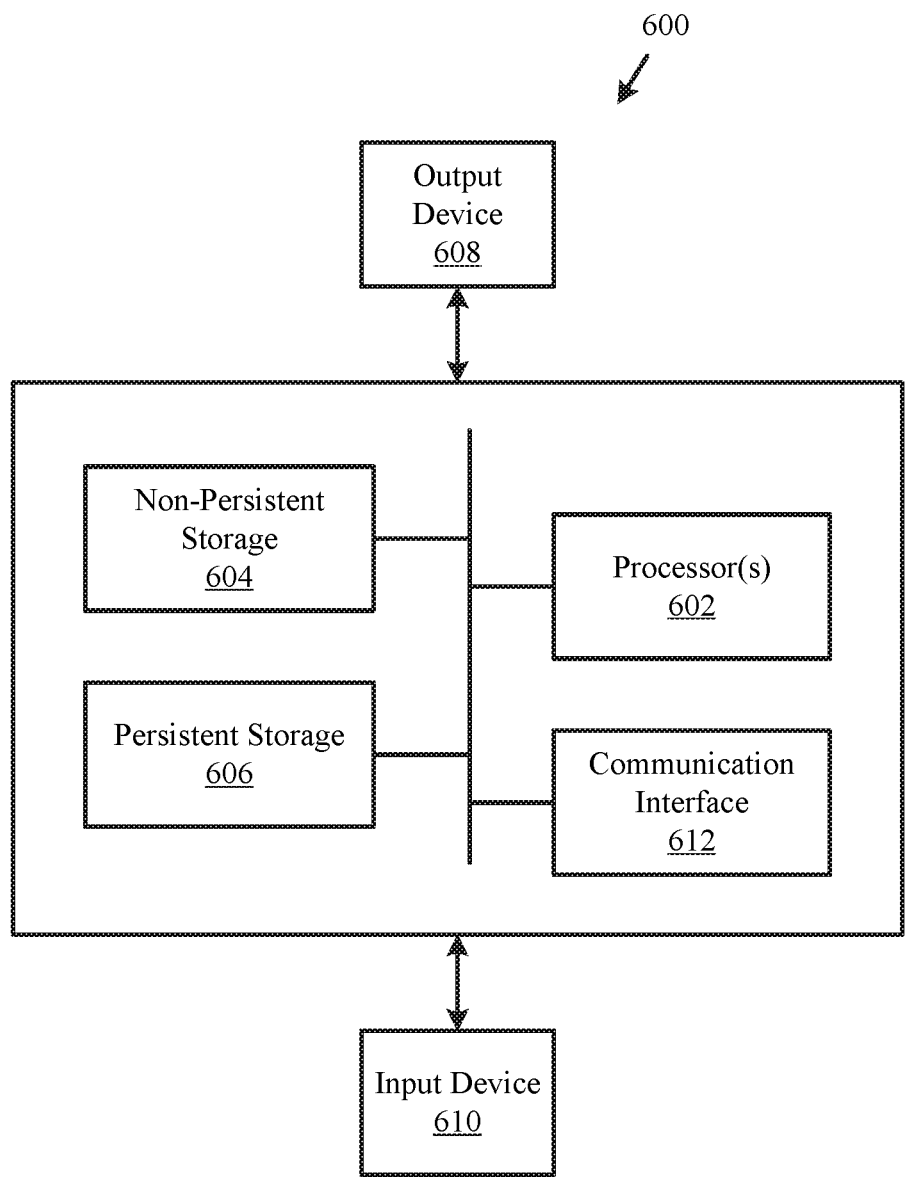
FIG. 6 shows a diagram of a computing device in accordance with one or more embodiments of the invention.

In one or more embodiments of the invention, the production host (110A) is implemented as a computing device (see e.g., FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (110A) described throughout this application.

In one or more embodiments of the invention, the production host (110A) is implemented as a logical device. The logical device may utilize the computing resources of any number of computing devices and thereby provide the functionality of the production host (110A) described throughout this application.

In one or more embodiments of the invention, the backup server (120A) services backup requests obtained from the clients (100). The backup requests may specify backing up the virtual machines (e.g., 112). The backup server (120A) may service the backup requests in accordance with FIG. 2A. To perform the aforementioned functionality, the backup server (120A) may include classification data (122), an unprocessed backup (124), and a data processor (126). The backup server (120A) may include additional, fewer, and/or different components without departing from the invention. Each of the aforementioned components are discussed below.

In one or more embodiments of the invention, the classification data (122) is data obtained from the production host (110A). The classification data (122) may specify data that enables the data processor (126) to classify a virtual machine (e.g., 112). The classification data (122) may include, for example, data written by the virtual machine, metadata that specifies the data managed by the virtual machine, logs that specify users that accessed the data managed by the virtual machine (112) and/or the type of data managed by the virtual machine, and/or any other type of information related to or otherwise associated with the virtual machine (or application executing thereon) without departing from the invention.

In one or more embodiments of the invention, the unprocessed backup (124) is a backup, generated by, and obtained from, the backup agent (116A). The unprocessed backup (124) may go through a processing performed by the data processor (126) to classify the unprocessed backup (124) and, based on the classification, further process the unprocessed backup (124) prior to storing corresponding processed backup in the backup storage system (150).

In one or more embodiments of the invention, the data processor (126) processes the unprocessed backup (124) (and/or any other unprocessed backup obtained by the backup server (120A)) based on classification data (122). To perform the aforementioned functionality, the data processor (126) includes an analysis engine (126A), a processing engine (126B), and key manager (126C). The data processor may include additional, fewer, and/or different components without departing from the invention.

In one or more embodiments of the invention, the analysis engine (126A) processes the classification data (122) associated with the virtual machine (112) to generate a sensitivity tag to be applied to the unprocessed backup (124) of the virtual machine (112). The sensitivity tag may be, for example, a string of numbers, letters, and/or characters that specify a sensitivity of the unprocessed backup (124). The sensitivity may be a measurement of how important the data in the unprocessed backup is. Further, the sensitivity may be a measurement of how important the privacy of the data is. For example, data that is meant to be extremely private (e.g., hospital records, trade secret documents, etc.) are classified with a highly sensitive sensitivity tag. The sensitivity tag may be generated by analyzing the classification data (122) in accordance with FIG. 2A. The sensitivity tag may be applied to the unprocessed backup (124) after the generation.

In one or more embodiments of the invention, the processing engine (126B) processes the unprocessed backup (124) based on a sensitivity tag generated by the analysis engine (126B). The processing engine (126B) may implement additional security measures to the unprotected backup (124) if the sensitivity tag applied to the unprocessed backup (124) specifies highly sensitive data.

For example, an unprocessed backup (124) with a highly sensitive sensitivity tag may be processed by incorporating additional security measures such as, for example, encryption, replication, digital signature generation, extended retention periods, etc. to backups of the highly-sensitive virtual machine. The result of the processing may be a processed backup. The processed backup may be stored in the backup storage system (150).

In one or more embodiments of the invention, the key manager (126C) manages public and/or private keys utilized by the backup server to encrypt the processed backups (152, 154) in the backup storage system (150). During restoration, a processed backup (152, 154) that has been processed with encryption may be decrypted using data (e.g., a key) stored in the key manager (126C).

The key manager (126C) may further include information that specifies the users that are allowed to access the data encrypted in the processed backups (152, 154). For example, the backup server (120A) may perform user authentication using the information stored in the key manager (126C) to determine whether a user requesting to access encrypted data is permitted to access the encrypted data.

In one or of embodiments of the invention, the data processor (126), and/or any portion thereof, is implemented as computer instructions, e.g., computer code, stored on a persistent storage that when executed by a processor of the backup server (120A) causes the backup server (120A) to provide the functionality of the data processor (126) described throughout this application and/or all, or a portion thereof, of the method illustrated in FIG. 2A.

In one or more embodiments of the invention, the backup server (120A) is implemented as a computing device (see e.g., FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup server (120A) described throughout this application and/or all, or a portion thereof, of the method illustrated in FIG. 2A.

In one or more embodiments of the invention, the backup server (120A) is implemented as a logical device. The logical device may utilize the computing resources of any number of computing devices and thereby provide the functionality of the backup server (120A) described throughout this application and/or all, or a portion thereof, of the method illustrated in FIG. 2A.

In one or more embodiments of the invention, the client(s) (100) utilize services provided by the production host (110), and/or the backup server (120A). Specifically, the client(s) (100) may utilize the virtual machines (112) to obtain, modify, and/or store data. The data may be generated from applications hosted in the virtual machine (112). Further, the client(s) (100) may utilize the backup server (120A) to initiate backups of the virtual machines (e.g., 112). The client(s) (100) may trigger a backup operation performed by the backup server (120A) by sending a backup request to the backup agent (116A) that specifies backing up the virtual machine (112).

In one or more embodiments of the invention, a client (100) is implemented as a computing device (see e.g., FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client (100) described throughout this application.

In one or more embodiments of the invention, the client(s) (100) are implemented as a logical device. The logical device may utilize the computing resources of any number of computing devices and thereby provide the functionality of the client(s) (100) described throughout this application.

In one or more embodiments of the invention, the backup storage system (150) store backups of the virtual machines (142). In one or more embodiments of the invention, a backup is a copy of data associated with a virtual machine (112) at a specified point in time.

In one or more embodiments of the invention, the processed backups (152, 154), are processed after being generated in accordance with a classification tag applied to the corresponding virtual machine. Based on the classification tag, the backups (152, 154) are processed to include additional security measures to protect the data of the processed backup. The processed backups (152, 154) may only include sensitivity tags or may include sensitivity tags as well as include other security measures (e.g., be encrypted) without departing from the invention.

In one or more embodiments of the invention, the backup storage system (150) is implemented as a computing device (see e.g., FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage system (150) described throughout this application.

In one or more embodiments of the invention, the backup storage system (150) is implemented as a logical device. The logical device may utilize the computing resources of any number of computing devices and thereby provide the functionality of the backup storage system (150) described throughout this application.

FIGS. 2A-2B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2B may be performed in parallel with any other steps shown in FIGS. 2A-2B without departing from the scope of the invention.

FIG. 2A shows a flowchart for servicing backup requests in accordance with one or more embodiments of the invention. The method shown in FIG. 2A may be performed by, for example, a backup server (120A, FIG. 1). Other components of the system illustrated in FIG. 1 may perform the method of FIG. 2A without departing from the invention.

In step 200, a backup request is obtained for a virtual machine hosted by a production host. The backup request may specify the virtual machine to be backed up via, for example, a virtual machine identifier.

In step 202, a backup initiation request is sent to a backup agent. In one or more embodiments of the invention, the backup initiation request specifies the virtual machine of the backup request to be backed up. The backup initiation request may specify generating an unprocessed backup of the virtual machine and sending the unprocessed backup to the backup server. Further, the backup initiation request may specify obtaining classification data from the production host that may be used to further process the unprocessed backup.

In step 204, classification data and an unprocessed backup are obtained from the backup agent.

In step 206, a backup classification is initiated on the obtained the classification data to obtain a sensitivity tag. In one or more embodiments of the invention, the backup classification includes analyzing the obtained classification data to determine a type of data associated with the virtual machine.

For example, a virtual machine may host a database that stores hospital records. The classification data may include metadata that specifies the type of data in the database. The classification data may be analyzed to identify the type of data. The backup classification may be performed by an analysis engine of a data processor of the backup server. The analysis engine, based on the data classification, may determine that the hospital records are highly sensitive data. Based on the determination, the result of the backup classification may be generating a high sensitivity tag and applying the high sensitivity tag to the obtained unprocessed backup.

In step 208, a data processing is performed on the obtained backup of the virtual machine using the sensitivity tag to obtain a processed backup. The data processing may include identifying the sensitivity tag of the unprocessed backup and implementing additional security measures (if any) to the unprocessed backup based on the sensitivity specified in the sensitivity tag.

If the sensitivity tag specifies a low sensitivity of the unprocessed backup, the data processing may include storing the backup in the backup storage without further encryption, replication, and/or other security measures. After this determination that the backup is tagged with a low sensitivity tag, the unprocessed backup is deemed processed.

If the sensitivity tag specifies a high sensitivity, the data is processed by implementing additional security measures to the unprocessed backup. The amount of additional security measures may be based on how high the sensitivity is. For example, the sensitivity tag may specify sensitivity levels for the unprocessed backups. The higher the sensitivity level, the more security measures that are implemented on the unprocessed backup prior to storage.

For example, a middle-level sensitivity tag on an unprocessed backup may result in performing replication of the unprocessed backup. A higher-level sensitivity tag may result in performing both replication and encryption using a private key on the unprocessed backup. Other security measures may be implemented on the middle-level and/or the higher-level sensitivity tags without departing from the invention.

In one or more embodiments of the invention, the data processing includes performing varying levels of encryption based on the varying levels of sensitivity of the sensitivity tag.

In one or more embodiments of the invention, any public or private keys used for the encryption of the unprocessed backup may be stored in a key manager of the data processor.

In step 210, the processed backup (e.g., the backup resulting from the processing in step 208) is stored in a backup storage system. In one or more embodiments of the invention, if the processed backup is processed by being replicated, the replicated backups are subsequently stored in the backup storage system in addition to the processed backup.

FIG. 2B shows a flowchart for servicing backup initiation requests in accordance with one or more embodiments of the invention. The method shown in FIG. 2B may be performed by, for example, a backup agent (116A, FIG. 1). Other components of the system illustrated in FIG. 1 may perform the method of FIG. 2B without departing from the invention.

In step 220, a backup initiation request is obtained from a backup agent for a virtual machine hosted by the production host.

In step 222, classification data associated with the virtual machine is sent to the backup server. In one or more embodiments of the invention, the classification data is obtained by the backup agent from a classification engine of the virtual machine. The backup agent may send a classification request to the classification engine to obtain the classification data. Alternatively, the classification data is obtained from the classification engine prior to obtaining the backup initiation request and stored in memory of the backup agent.

In one or more embodiments of the invention, the classification engine obtains the classification data via APIs provided by the virtual machines that collect data and/or metadata that may be used to identify a sensitivity of the data managed by the virtual machine and/or applications executing on the virtual machine.

In step 224, an unprocessed backup of the virtual machine is generated. In one or more embodiments of the invention, the unprocessed backup is generated by generating a copy of the data associated with the virtual machine. Further, additional data (e.g., configuration information) may be generated for the backup that specifies settings for restoring the virtual machine during a restoration.

In step 226, the unprocessed backup is sent to the backup server for processing.

Figure 3:
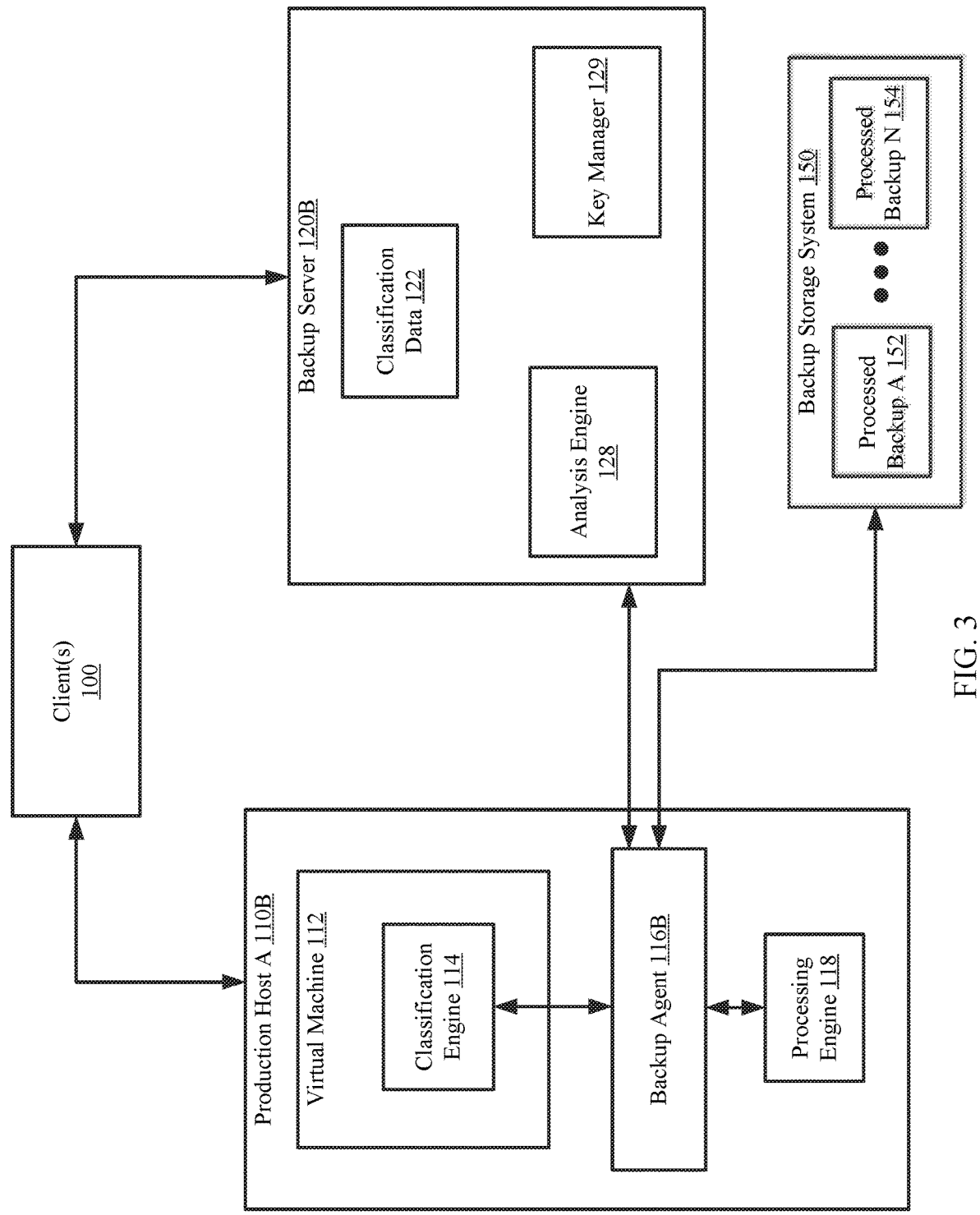
FIG. 3 shows a diagram of a system in accordance with one or more embodiments of the invention.

FIG. 3 shows a diagram of a system in accordance with one or more embodiments of the invention. The system may include one or more clients (100), a production host (110B), a backup server (120B), and a backup storage system (150). The clients (100) and the backup storage system (150) illustrated in FIG. 3 may be similar to that of FIG. 1. The system may include additional, fewer, and/or different components without departing from the invention. Each component may be operably connected to any of the other components via any combination of wired and/or wireless connections. Each of the aforementioned components is discussed below.

In one or more embodiments of the invention, the production host (110A) hosts virtual machines (VMs) (e.g., 112). The VMs hosted by the production host (110) may be similar to the virtual machines (e.g., 112, FIG. 10 discussed above.

In one or more embodiments of the invention, the production host (110B) includes a backup agent (116B). A backup agent may include functionality for generating backups of the virtual machine (112) and/or sending the backups to the backup server (120A) for further processing. Further, the backup agent (116B) may include functionality for offloading the processing of the backups to a processing engine (118), operating on the production host (110B), in accordance with sensitivity tags (discussed above) applied to unprocessed backups. The backup agent (116B) may perform the backups and offload the processing in accordance with the method illustrated in FIG. 4B.

In one or more embodiments of the invention, the backup agent (116B) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup agent (116B) described throughout this application and/or all, or a portion thereof, of the method illustrated in FIG. 4B.

Figure 4A:
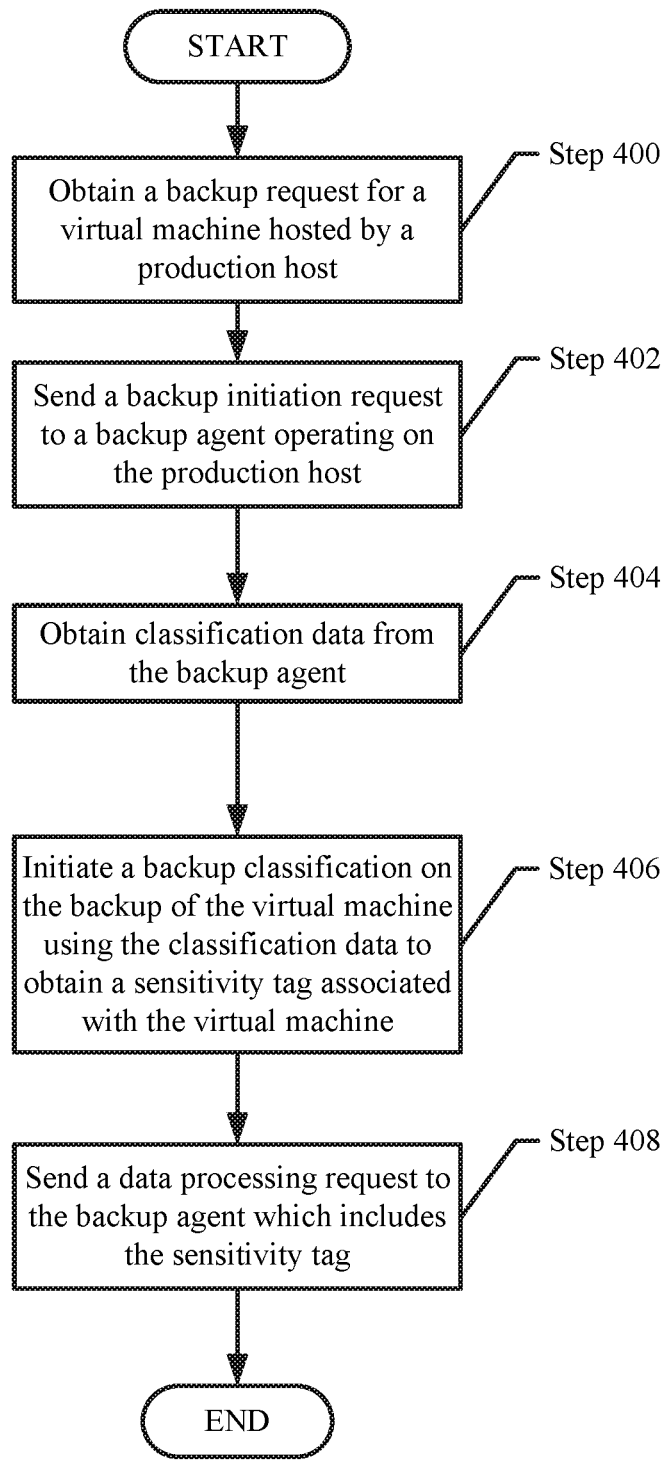
FIG. 4A shows a flowchart for servicing backup requests in accordance with one or more embodiments of the invention.
Figure 4B:
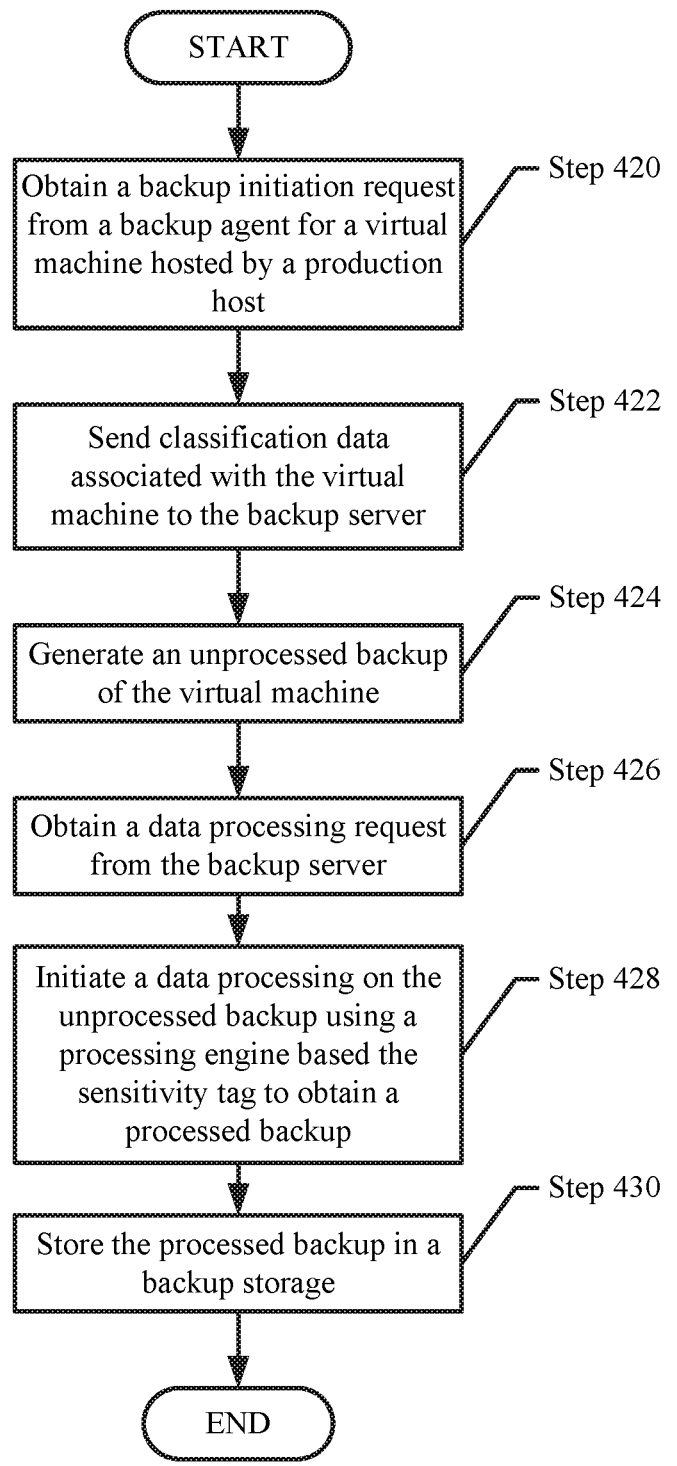
FIG. 4B shows a flowchart for servicing backup initiation requests in accordance with one or more embodiments of the invention.

In one or more of embodiments of the invention, the backup agent (116B) is implemented as computer instructions, e.g., computer code, stored on a persistent storage that when executed by a processor of the production host (110B) causes the production host (110B) to provide the functionality of the backup agent (116B) described throughout this application and/or all, or a portion thereof, of the method illustrated in FIG. 4B.

In one or more embodiments of the invention, the production host (110B) is implemented as a computing device (see e.g., FIG. 6). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (110B) described throughout this application.

In one or more embodiments of the invention, the production host (110B) is implemented as a logical device. The logical device may utilize the computing resources of any number of computing devices and thereby provide the functionality of the production host (110B) described throughout this application.

In one or more embodiments of the invention, the backup server (120B) services backup requests obtained from the clients (100). The backup requests may specify backing up the virtual machines (e.g., 112). The backup server (120B) may service the backup requests in accordance with FIG. 4A. To perform the aforementioned functionality, the backup server (120B) may include classification data (122) (similar to the classification data of FIG. 1), an analysis engine (128), and a key manager (129). The backup server (120B) may include additional, fewer, and/or different components without departing from the invention. The analysis engine (128) may be similar to the analysis engine (126B, FIG. 1) discussed above. Further, the key manager (129) may be similar to the key manager (126C) discussed above.

To further clarify the difference between the system illustrated in FIG. 3 and the system in FIG. 1, the processing engine (118) of FIG. 3 performs its functionality on the production host (110B). In contrast, the processing engine (126A) in FIG. 1 performs its functionality on the backup server (120A, FIG. 1). The systems of FIG. 3 and FIG. 1 may vary via other differences without departing from the invention.

FIGS. 4A-4B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 4A-4B may be performed in parallel with any other steps shown in FIGS. 4A-4B without departing from the scope of the invention.

FIG. 4A shows a flowchart for servicing backup requests in accordance with one or more embodiments of the invention. The method shown in FIG. 4A may be performed by, for example, a backup server (120B, FIG. 3). Other components of the system illustrated in FIG. 3 may perform the method of FIG. 4A without departing from the invention.

In step 400, a backup request is obtained for a virtual machine hosted by a production host. The backup request may specify the virtual machine to be backed up via, for example, a virtual machine identifier.

In step 402, a backup initiation request is sent to a backup agent. In one or more embodiments of the invention, the backup agent is operating on the production host. In one or more embodiments of the invention, the backup initiation request specifies the virtual machine of the backup request to be backed up. The backup initiation request may specify generating an unprocessed backup of the virtual machine. Further, the backup initiation request may specify obtaining classification data from the production host that may be used to further process the unprocessed backup.

In step 404, classification data is obtained from the backup agent.

In step 406, a backup classification is initiated on the backup of the virtual machine using the classification data to obtain a sensitivity tag. In one or more embodiments of the invention, the backup classification includes analyzing the obtained classification data to determine a type of data associated with the virtual machine. The analysis may be similar to that of step 206 of the method of FIG. 2A. The result of the backup classification may be a sensitivity tag associated with a backup of the virtual machine.

In step 408, a data processing request is sent to the backup agent. In one or more embodiments of the invention, the data processing request includes the sensitivity tag to be applied to an unprocessed backup of the virtual machine. The data processing request may specify processing a backup in accordance with the generated sensitivity tag.

FIG. 4B shows a flowchart for servicing backup initiation requests in accordance with one or more embodiments of the invention. The method shown in FIG. 4B may be performed by, for example, a backup agent (116B, FIG. 3). Other components of the system illustrated in FIG. 1 may perform the method of FIG. 4B without departing from the invention.

In step 420, a backup initiation request is obtained from a backup agent for a virtual machine hosted by the production host.

In step 422, classification data associated with the virtual machine is sent to the backup server. In one or more embodiments of the invention, the classification data is obtained by the backup agent from a classification engine of the virtual machine. The backup agent may send a classification request to the classification engine to obtain the classification data. Alternatively, the classification data is obtained from the classification engine prior to obtaining the backup initiation request and stored in memory of the backup agent.

In step 424, an unprocessed backup of the virtual machine is generated. In one or more embodiments of the invention, the unprocessed backup is generated by generating a copy of the data associated with the virtual machine. Further, additional data (e.g., configuration information) may be generated for the backup that specifies settings for restoring the virtual machine during a restoration.

In step 426, a data processing request is obtained from the backup server. The data processing request may include a sensitivity tag that is associated with the unprocessed backup.

In step 428, a data processing is initiated on the unprocessed backup based on the sensitivity tag to obtain a processed backup. The data processing may be performed by a processing engine of the production host. The data processing may include identifying the sensitivity tag of the unprocessed backup and implementing additional security measures (if any) to the unprocessed backup based on the sensitivity specified in the sensitivity tag. The data processing may be similar to the data processing discussed in step 208 of the method of FIG. 2A. The result of the data processing may be a processed backup.

In step 430, the processed backup is stored in a backup storage system. In one or more embodiments of the invention, if the processed backup is processed by being replicated, the replicated backups are subsequently stored in the backup storage system in addition to the processed backup.

Example

Figure 5:
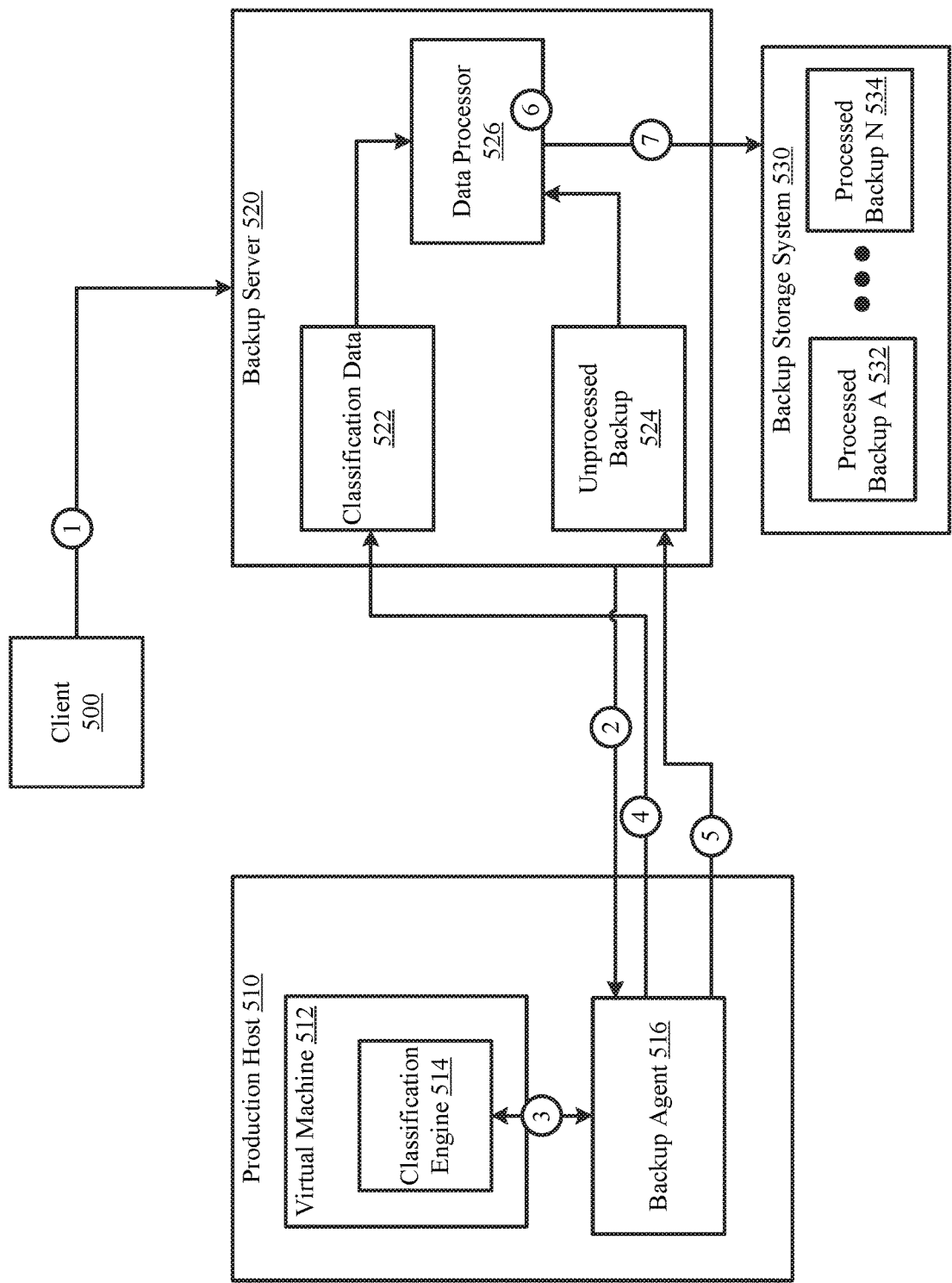
FIG. 5 shows an example in accordance with one or more embodiments of the invention.

The following section describes an example. The example, illustrated in FIG. 5, is not intended to limit the invention. Turning to the example, consider a scenario in which a system is performing a backup operation on a virtual machine. The system includes a client (500), a backup server (520), a production host (510), and a backup storage system (530).

The client (500) initiates the backup operation by sending a backup request to the backup server (520) specifying backing up a virtual machine (512) hosted by the production host (510) [1]. In response to the backup request, the backup server (520) sends a backup initiation request to a backup agent (516) operating on the production host (510) [2]. The backup initiation request specifies performing a backup of the virtual machine (512), sending the backup to the backup server (520), and sending any classification data associated with the virtual machine (512).

The virtual machine (512) hosts a database of financial records for a company. The virtual machine (512) includes a classification engine (514) that monitors the data included in the database. The classification engine (514), acting independently from the backup agent (516), gathers metadata associated with the virtual machine (512) and obtains information (i.e., the classification data in this example) associated with the database stored in the virtual machine (512).

The backup agent, in response to the backup initiation request, obtains the classification data from the classification engine (514) [3] and sends the classification data (522) to the backup server (520) [4]. Further, the backup agent generates an unprocessed backup of the virtual machine (512) and sends the unprocessed backup (524) to the backup server (520) [5].

The backup server (520), after obtaining the classification data (522), and the unprocessed backup (524), performs a data classification and data processing on the unprocessed backup (524) using the classification data (522) [6]. Specifically, the backup server (520) uses a data processor (526) to process the classification data (522) to obtain a sensitivity tag. The data processor identifies the financial information specified in the classification data (522) and generates a highly sensitive sensitivity tag. The data processor (526) based on the highly sensitive sensitivity tag encrypts the backup and then stores the encrypted backup in the backup storage system (530) [7].

End of Example

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the efficiency of performing a backup operation by intelligently prioritizing the backup processing of more sensitive data over less sensitive data. The more sensitive data is prioritized by monitoring the data of a virtual machine and identifying characteristics of the data to determine the sensitivity of the data. The sensitivity of the data may then be used to apply additional security measures to certain backups based on the sensitivity of the data.

Thus, embodiments of the invention may address the problem of inefficient use of computing resources. This problem arises due to the technological nature of the environment in which restorations are performed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for performing backup operations, the method comprising:
   obtaining, by a backup server, a backup request, wherein the backup request specifies a virtual machine to be backed up, wherein the virtual machine is hosted by a production host, and wherein the virtual machine includes functionality for performing a process that provides a service to a user; and
   in response to the backup request:
      obtaining classification data from a backup agent, wherein the classification data specifies the functionality;
      initiating a backup classification on an unprocessed backup associated with the virtual machine based on the classification data to obtain a sensitivity tag of sensitivity tags, wherein the sensitivity tags comprise a high sensitivity tag, a medium sensitivity tag, and a low sensitivity tag; and
      initiating a data processing on the unprocessed backup based on the sensitivity tag,. wherein:
         the sensitivity tag is determined to comprise the high sensitivity tag, and
         in response to the determining, initiating the data processing, wherein the data processing comprises generating a processed backup by:
            performing encryption on the unprocessed backup using a private key to generate an encrypted backup,
            replicating the encrypted backup,
            generating a digital signature of the encrypted backup,
            extending a retention period associated with the encrypted backup, and
            performing user authentication for access of the encrypted backup.

2. The method of claim 1, further comprising:
   obtaining the unprocessed backup from the backup agent; and
   storing the processed backup in a backup storage system.

3. The method of claim 1, wherein initiating the data processing on the unprocessed backup comprises:
   sending a data processing request to the backup agent, wherein the data processing request specifies performing the data processing using the sensitivity tag.

4. The method of claim 1, wherein the classification data is generated by a classification engine operating in the virtual machine.

5. A system, comprising:
   a processor; and
   memory comprising instructions which, when executed by the processor, perform a method, the method comprising:
      obtaining, by a backup server, a backup request, wherein the backup request specifies a virtual machine to be backed up, wherein the virtual machine is hosted by a production host, and wherein the virtual machine includes functionality for performing a process that provides a service to a user; and
      in response to the backup request:
         obtaining classification data from a backup agent, wherein the classification data specifies the functionality;
         initiating a backup classification on an unprocessed backup associated with the virtual machine based on the classification data to obtain a sensitivity tag of sensitivity tags, wherein the sensitivity tags comprise a high sensitivity tag, a medium sensitivity tag, and a low sensitivity tag; and
         initiating a data processing on the unprocessed backup based on the sensitivity tag, wherein:
            the sensitivity tag is determined to comprise the high sensitivity tag, and
            in response to the determining, initiating the data processing, wherein the data processing comprises generating a processed backup by:
               performing encryption on the unprocessed backup using a private key to generate an encrypted backup,
               replicating the encrypted backup,
               generating a digital signature of the encrypted backup,
               extending a retention period associated with the encrypted backup, and performing user authentication for access of the encrypted backup.

6. The system of claim 5, further comprising:
obtaining the unprocessed backup from the backup agent;
storing the processed backup in a backup storage system.

7. The system of claim 5, wherein initiating the data processing on the unprocessed backup comprises:
sending a data processing request to the backup agent, wherein the data processing request specifies performing the data processing using the sensitivity tag.

8. The system of claim 5, wherein the classification data is generated by a classification engine operating in the virtual machine.

9. A non-transitory computer readable medium comprising computer readable program code, which when executed by a computer processor enables the computer processor to perform a method for performing a backup operation, the method comprising:
obtaining, by a backup server, a backup request, wherein the backup request specifies a virtual machine to be backed up, wherein the virtual machine is hosted by a production host, and wherein the virtual machine includes functionality for performing a process that provides a service to a user; and
in response to the backup request:
obtaining classification data from a backup agent, wherein the classification data specifies the functionality;
initiating a backup classification on an unprocessed backup associated with the virtual machine based on the classification data to obtain a sensitivity tag of sensitivity tags, wherein the sensitivity tags comprise a high sensitivity tag, a medium sensitivity tag, and a low sensitivity tag; and
initiating a data processing on the unprocessed backup based on the sensitivity tag, wherein:
the sensitivity tag is determined to comprise the high sensitivity tag, and
in response to the determining, initiating the data processing, wherein the data processing comprises generating a processed backup by:
performing encryption on the unprocessed backup using a private key to generate an encrypted backup,
replicating the encrypted backup,
generating a digital signature of the encrypted backup,
extending a retention period associated with the encrypted backup, and
performing user authentication for access of the encrypted backup.

10. The non-transitory computer readable medium of claim 9, the method further comprising:
obtaining the unprocessed backup from the backup agent;
storing the processed backup in a backup storage system.

11. The non-transitory computer readable medium of claim 9, wherein initiating the data processing on the unprocessed backup comprises:
sending a data processing request to the backup agent, wherein the data processing request specifies performing the data processing using the sensitivity tag.

* * * * *